F. P. EASTMAN.
SELF DUMPING SCOW.
APPLICATION FILED SEPT. 24, 1914.
1,138,463.
Patented May 4, 1915.
2 SHEETS—SHEET 2.
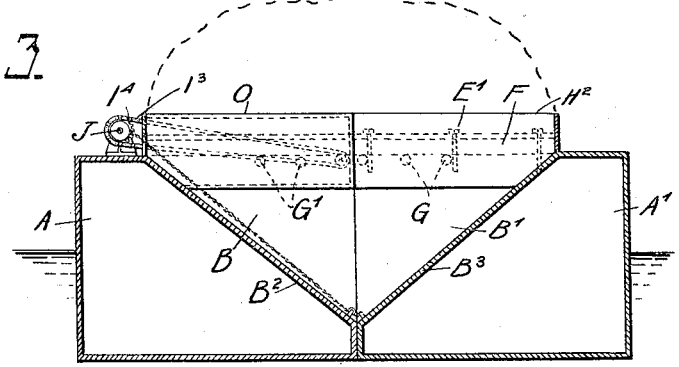
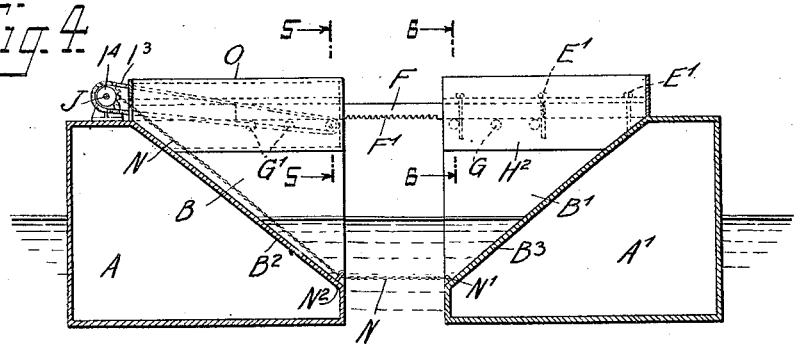
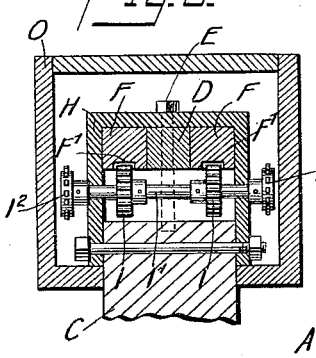
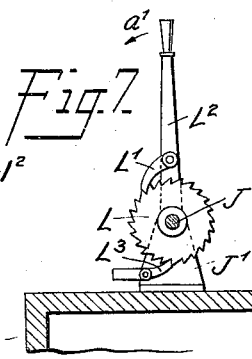
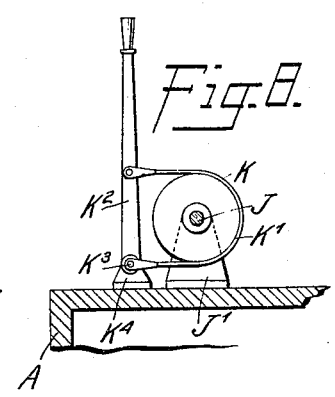
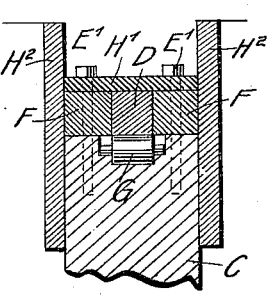
WITNESSES
George L. Blume.
INVENTOR
Franklin Pierce Eastman
BY
ATTORNEYS

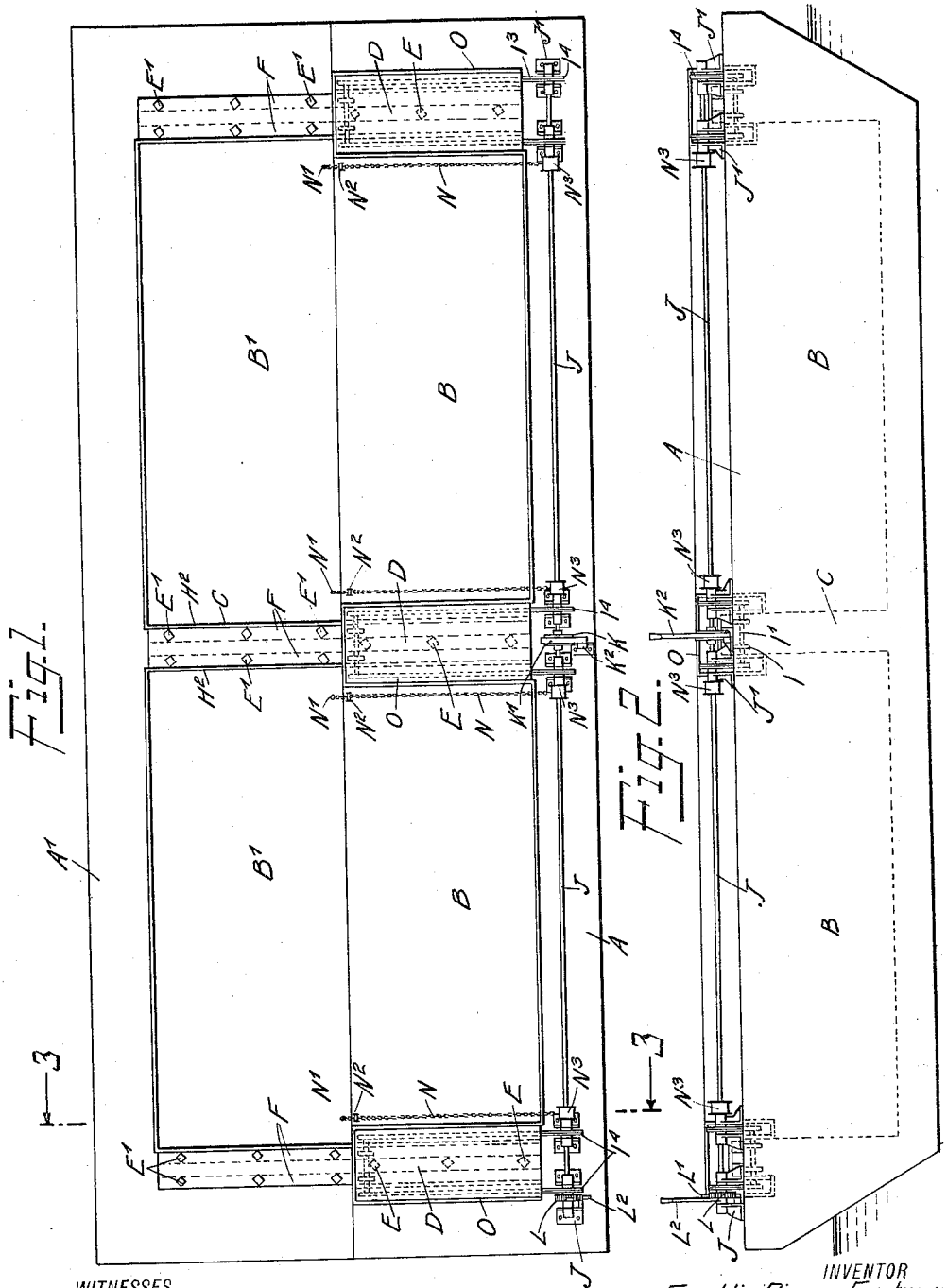

UNITED STATES PATENT OFFICE.

FRANKLIN PIERCE EASTMAN, OF NEW YORK, N. Y.

SELF-DUMPING SCOW.

1,138,463.  Specification of Letters Patent.  Patented May 4, 1915.

Application filed September 24, 1914. Serial No. 863,276.

*To all whom it may concern:*

Be it known that I, FRANKLIN PIERCE EASTMAN, a citizen of the United States, and a resident of the city of New York, borough of Manhattan, in the county and State of New York, have invented a new and Improved Self-Dumping Scow, of which the following is a full, clear, and exact description.

The object of the invention is to provide a new and improved dumping scow arranged to permit of safely carrying a load to a dumping place out at sea, to permit in almost any kind of weather discharging the load without requiring extra power, and to prevent the scow from being unduly strained when subjected to the heaving pounding action of a rough sea.

In order to accomplish the desired result, use is made of two hulls or floats affording between them a hopper for holding the load at the time the hulls are abutting sidewise at their opposite sides, and for allowing the load to dump automatically on the hulls being forced apart by the load, and connecting means at a right angle to the length of the scow and slidably connecting the hulls with each other to maintain the hulls in the same plane when in closed or open position.

A practical embodiment of the invention is represented in the accompanying drawings forming a part of this specification, in which similar characters of reference indicate corresponding parts in all the views.

Figure 1 is a plan view of the dumping scow with the hulls in closed position to form a unitary structure; Fig. 2 is a side elevation of the same; Fig. 3 is a cross section of the same on the line 3—3 of Fig. 1; Fig. 4 is a similar view of the same with the hulls moved apart for dumping the load; Fig. 5 is an enlarged sectional side elevation of the connecting device for the two hulls, the section being on the line 5—5 of Fig. 4; Fig. 6 is a similar view of the same on the line 6—6 of Fig. 4; Fig. 7 is a cross section of the actuating means for turning the controlling shaft; and Fig. 8 is a similar view of the brake mechanism on the controlling shaft.

The self-dumping scow in its general construction consists essentially of two hulls or floats A and A', adapted to move toward or from each other in a transverse direction, the hulls when moving toward each other into a closed position having their inner or opposite sides abutting to form a single unitary structure for carrying a load (see Figs. 1 and 3). The hulls A and A' when moved apart into an open position allow the load to dump as shown in Fig. 4. In order to carry the load and to allow self-dumping of the same the hulls A and A' are provided with two or more sets or pairs of half hoppers B, B' having bottoms $B^2$, $B^3$ inclined downwardly and inwardly, so that when the hulls A and A' are in closed position then each pair of half hoppers form a whole hopper for receiving and carrying a load, as will be readily understood by reference to Fig. 3. When the hulls are allowed to move into open position by the pressure of the load on the inclined bottoms $B^2$, $B^3$, then the load slides down the said bottoms into the sea between the open hulls. As shown in Figs. 1 and 2, the scow is provided with two hoppers, the halves of which are separated in each hull by a bulkhead C.

Various attempts have been made to provide two hulls of the construction described and capable of moving toward and from each other, but these attempts have been failures owing to the means employed for connecting the hulls with each other, it being understood that the exceedingly heavy pounding which the hulls are liable to receive when in open position in a rough sea tends to render the connection unserviceable and damage the hulls, at the same time preventing the return or closing movement of the hulls. In order to allow the said hulls to safely open for dumping purposes in a rough or smooth sea and to permit of returning the hulls to closed position, the following arrangement is made: A transversely extending beam D is secured to the deck of the hull A at each end and at its bulkhead C by the use of bolts or other fastening means E, and each beam D projects beyond the inner side of the hull A onto the deck of the other hull A', the projecting end extending into a guideway formed by two spaced beams F, F fastened to the deck of the hull A' by bolts or other fastening devices E'. The beams F, F project beyond the hull A' onto the deck of the hull A to thus extend on opposite sides of the fixed end of the beam D. Thus the beam D is guided between the beams F, F and the latter are guided on the sides of the beam D to form an exceedingly strong and rigid structure to hold the hulls A and A' firmly in position, one relative to the other at the time the said hulls A and A' are in the open position shown in Fig. 4. In order to insure an easy sliding movement of the projecting end of the beam D between the fixed ends of the beams F, F use is made of a friction roller G journaled on the hull A' and over which travels the under side of the beam D. Similar friction rollers G' are journaled on the hull A and engage the under sides of the projecting ends of the beams F, F. The ends of the beams F on the deck of the hull A and the fixed portion of the beam D are incased in a casing H bolted or otherwise fastened to the hull A to prevent upward, forward or backward movement of the projecting ends of the beams F. The fixed portions of the beams F and the projecting end of the beam D are covered by a top plate H' (see Fig. 6) fastened by the bolts E' in position on the hull A'. The sides of the fixed portions of the beams F are flanked by plates H² forming permanent parts of the hull A'. By the arrangement described the beams D and F, F are held against forward or backward movement or up and down movement and are at the same time protected from the load to insure a free sliding of the projecting ends of the beams in a transverse direction.

In order to control the gradual opening movement of the hulls A and A' and to permit of drawing the hulls back into closed position, the following arrangement is made: The under sides of the projecting ends of the beams F, F are provided with racks F' in mesh with gear wheels I secured on a transverse shaft I' journaled in the housing H, near the inner side of the hull A, and on the outer ends of the said shaft I' are secured sprocket wheels I² connected by sprocket chains I³ with sprocket wheels I⁴ secured on a shaft J extending lengthwise of the scow on the deck of the hull A near the outer side thereof, the shaft being journaled in suitable bearings J' attached to the said deck. On the shaft J, preferably at the middle of the scow, is secured a brake wheel K around which passes a brake band K' fastened at one end to a brake lever K² under the control of an operator and fulcrumed at K³ on a bracket K⁴ attached to the deck of the hull A. The other end of the brake band K' is fixed on the pivot K³, as plainly shown in Fig. 8. On one end of the shaft J (see Figs. 1, 2 and 7) is secured a ratchet wheel L engaged by a pawl L' pivoted on a hand lever L² fulcrumed loosely on the shaft J so that when the hand lever L² is swung in the direction of the arrow a' then a turning motion is given to the shaft J by the pawl L' and the ratchet wheel L to turn the shaft J with a view to rotate the shaft I' to draw the hulls A and A' toward each other into a closed position. When the hulls are in closed position the shaft J is locked against return movement by a suitable dog L³ engaging the ratchet wheel L. When the scow is loaded and has been towed out to sea to a dumping place, and it is desired to discharge the load, then the shaft J is unlocked by throwing out the pawl L' and the dog L³ from the ratchet wheel L to allow the load pressing on the inclined bottoms B², B³ to force the hulls A and A' apart. In order to prevent this movement of the hulls A and A' from being too sudden, use is made of the brake mechanism above described and shown in detail in Fig. 8, it being understood that an operator having hold of the brake lever K² and applying the brake band K' on the brake wheel K with more or less force can readily govern the opening movement of the hulls A and A'. After the load is discharged the operator throws in the pawls L', L³ and oscillates the hand lever L² to rotate the shaft J with a view to cause the hulls A and A' to gradually move toward each other, the movement being nursed according to the condition of the sea.

In order to relieve the beams D and F of some of the strain when closing the hulls A and A', use is preferably made of chains N attached at N' to the lower ends of the bottoms B³ of the hoppers B', the chains then extending under guide pulleys N² journaled at the lower end of the bottom B² of the hoppers B. The chains N extend upwardly and outwardly along the bottoms B² to finally connect with drums N³ secured on the shaft J, it being understood that when the hulls A and A' are in closed position portions of the chains N are wound up on the drums N³, and when the hulls move apart, as previously explained, and the shaft J is rotating then the chains N unwind from the drums N³. When the shaft J is turned by the action of the hand lever L² for closing the hulls A and A' then the chains are wound up on the drums N³ and in doing so the chains draw on the lower portion of the hull A' to aid the mechanism previously described and connected with the beams F for drawing the hulls A and A' into closed position.

In order to protect the sprocket wheels I² and the chains I³ against being clogged up by the load, use is made of an inclosing casing O attached to the hull A.

It will be noticed that by providing the sliding beam connections between the hulls A and A' at the ends of the pockets and intermediate the same the hulls are free to move toward and from each other in the same plane no matter what the condition of the sea, and a positive dumping of the load is had as the hulls move uniformly apart throughout their length for dumping the load.

It is understood that the beam connection described is capable to withstand the heavy pounding action which the hulls are liable to be subjected to in a rough sea.

Having thus described my invention, I claim as new and desire to secure by Letters Patent:

1. A self-dumping scow, comprising two hulls affording between them a hopper for holding the load at the time the hulls are abutting sidewise and for allowing the load to dump automatically on the hulls moving apart, and connecting means at a right angle to the length of the scow and slidably connecting the hulls with each other to maintain the hulls in the same plane when closed or open.

2. A self-dumping scow, comprising two hulls affording between them a hopper for holding the load at the time the hulls are abutting sidewise and for allowing the load to dump automatically on the hulls moving apart, and connecting means at a right angle to the length of the scow and slidably connecting the hulls with each other above the water line to maintain the hulls in the same plane when closed or open.

3. A self-dumping scow, comprising two hulls affording between them a hopper for holding the load at the time the hulls are abutting at their opposite sides, a transverse guideway at one of the said hulls, and a beam fixed on the other hull and slidably engaging the said guideway.

4. A self-dumping scow, comprising two hulls affording between them a hopper for holding the load at the time the hulls are abutting at their opposite sides, a transverse guideway at one of the said hulls, a beam fixed on the other hull and slidably engaging the said guideway, and manually controlled means for drawing the hulls together after dumping.

5. A self-dumping scow, comprising two hulls affording between them a hopper for holding the load at the time the hulls are abutting at their opposite sides, a pair of spaced beams extending transversely and secured to one of the hulls, the said beams forming a guideway between them, and a transverse beam secured on the other hull and slidably fitting the said guideway.

6. A self-dumping scow, comprising two hulls affording between them a hopper for holding the load at the time the hulls are abutting at their opposite inner sides, a pair of spaced beams extending transversely and secured to one of the hulls and projecting a distance beyond the inner side of this hull, the said beams forming a guideway between them, and a transverse beam attached to the other hull and projecting beyond the inner side of this hull, the projecting end slidably engaging the said guideway.

7. A self-dumping scow, comprising two hulls affording between them a hopper for holding the load at the time the hulls are abutting at their opposite inner sides, a pair of spaced beams extending transversely and secured to one of the hulls and projecting a distance beyond the inner side of this hull, the said beams forming a guideway between them, a transverse beam attached to the other hull and projecting beyond the inner side of this hull, the projecting end slidingly engaging the said guideway, racks on the projecting ends of the said spaced beams, gear wheels journaled on the hull having the single beam and in mesh with the said rack, a shaft lengthwise of the hull carrying the said gear wheels, a flexible connection between the said gear wheels and the said shaft, and a brake connected with the said shaft to control the hulls when moving apart into open-dumping position.

8. A self-dumping scow, comprising two hulls affording between them a hopper for holding the load at the time the hulls are abutting at their opposite inner sides, a pair of spaced beams extending transversely and secured to one of the hulls and projecting a distance beyond the inner side of this hull, the said beams forming a guideway between them, a transverse beam attached to the other hull and projecting beyond the inner side of this hull, the projecting end slidingly engaging the said guideway, racks on the projecting ends of the said spaced beams, gear wheels journaled on the hull having the single beam and in mesh with the said rack, a shaft lengthwise of the hull carrying the said gear wheels, a flexible connection between the said gear wheels and the said shaft, and means for turning the said shaft to draw the hulls toward each other when in open position.

9. A self-dumping scow, comprising two hulls affording between them a hopper for holding the load at the time the hulls are abutting at their opposite inner sides, a pair of spaced beams extending transversely and secured to one of the hulls and projecting a distance beyond the inner side of this hull, the said beams forming a guideway between them, a transverse beam attached to the other hull and projecting beyond the inner side of this hull, the projecting end slidingly engaging the said guideway, racks on the projecting ends of the said spaced beams, gear wheels journaled on the hull having the single beam and in mesh with the said rack, a shaft lengthwise of the hull carrying the said gear wheels, a flexible connection between the said gear wheels and the said shaft, a winding drum on the said shaft, and a flexible connection connecting the said winding drum with the hull having the spaced beams.

10. A self-dumping scow, comprising two hulls affording between them a hopper for holding the load at the time the hulls are abutting at their opposite inner sides, a pair of spaced beams extending transversely and secured to one of the hulls and projecting a distance beyond the inner side of this hull, the said beams forming a guideway between them, a transverse beam attached to the other hull and projecting beyond the inner side of this hull, the projecting end slidingly engaging the said guideway, a shaft extending lengthwise on one of the said hulls, a gearing connecting the said shaft with the beam on the other hull, a drum on the said shaft, a flexible connection between the said drum and the other hull, a brake on the said shaft, means for rotating the said shaft, and means for locking the said shaft against rotation.

In testimony whereof I have signed my name to this specification in the presence of two subscribing witnesses.

FRANKLIN PIERCE EASTMAN.

Witnesses:
    THEO. G. HOSTER,
    G. H. EMSLIE.

Copies of this patent may be obtained for five cents each, by addressing the "Commissioner of Patents, Washington, D. C."